J. A. SUTTON.
PLOW ATTACHMENT FOR CULTIVATORS.
APPLICATION FILED NOV. 13, 1908.
961,044.
Patented June 7, 1910.
2 SHEETS—SHEET 1.
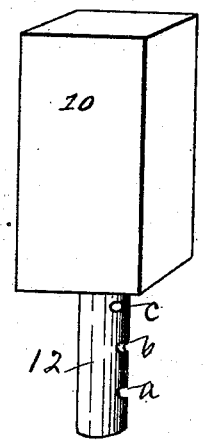
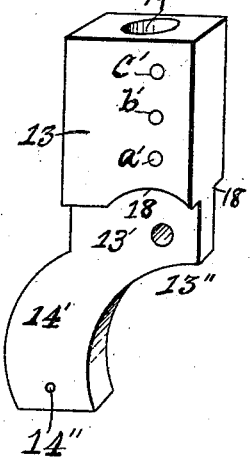
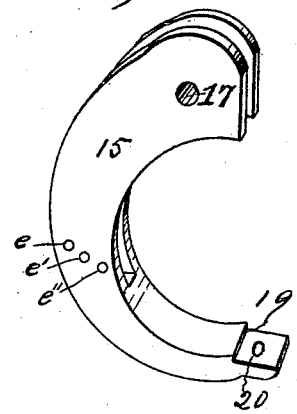
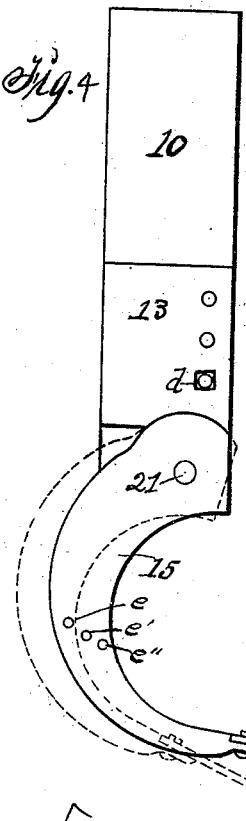
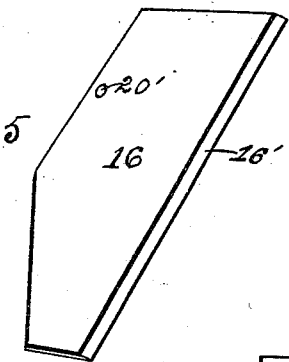
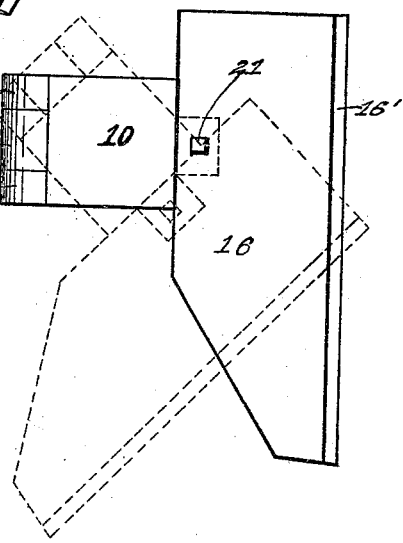

J. A. SUTTON.
PLOW ATTACHMENT FOR CULTIVATORS.
APPLICATION FILED NOV. 13, 1908.
961,044.
Patented June 7, 1910.
2 SHEETS—SHEET 2.
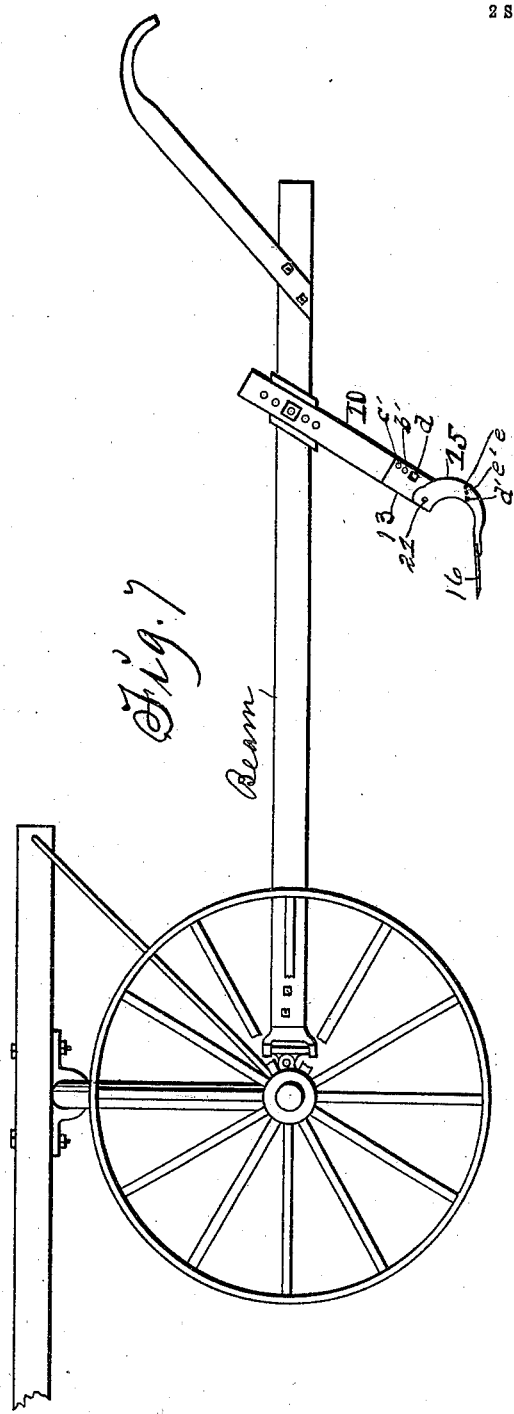

UNITED STATES PATENT OFFICE.

JAMES A. SUTTON, OF PACKWOOD, IOWA.

PLOW ATTACHMENT FOR CULTIVATORS.

961,044.  Specification of Letters Patent.  Patented June 7, 1910.

Application filed November 13, 1908. Serial No. 463,319.

*To all whom it may concern:*

Be it known that I, JAMES A. SUTTON, a citizen of the United States, residing at Packwood, in the county of Jefferson and State of Iowa, have invented a new and useful Plow Attachment for Cultivators, of which the following is a specification.

The object of this invention is to provide an attachment for cultivators susceptible of use as a surface plow and adapted to be adjusted on a vertical axis and also adapted to be adjusted on a horizontal axis.

My invention consists in the construction, arrangement and combination of elements hereinafter set forth, pointed out in my claims and illustrated by the accompanying drawing, in which—

Figure 1 is a perspective of a portion of a standard employed in my improved construction. Fig. 2 is a perspective of a stem adapted to be adjustably attached to the standard shown in Fig. 1. Fig. 3 is a perspective of a prong adapted to be adjustably attached to the stem shown in Fig. 2. Fig. 4 is a side elevation illustrating the standard, stem and prong assembled and connected at one of several points of attachment, the dotted lines indicating a different adjustment of the prong relative to the stem. This view also includes a shovel or blade in position for practical use. Fig. 5 is a perspective of the shovel or blade detached from the other parts. Fig. 6 is a plan of the device shown in Fig. 4, the dotted lines indicating the adjustment of the stem, prong and blade into one of several possible positions. Fig. 7 is a side elevation of a conventional form of cultivator showing my improved device attached to the beam thereof.

In the construction of the device as shown the numeral 10 designates a standard adapted to be secured, preferably in inclined position to the beam of a cultivator. The standard 10 is formed with a shank 12 circular in cross-section and projecting from the central portion of its lower end. The shank 12 is formed with transverse notches or grooves $a$, $b$ and $c$ arranged in a helical row on the periphery of said shank. The notches or grooves $a$, $b$ and $c$ are in different horizontal planes and on different lines longitudinally of the periphery of the shank, as illustrated in Fig. 1.

The numeral 13 designates a stem, preferably square in cross-section and conforming in such cross-section to the size and shape of the standard 10. The stem 13 is formed with a central bore 14 opening to its upper end and said bore conforms in diameter to and is adapted to receive the shank 12 of the standard 10. The stem 13 is formed with a plurality of transverse holes $a'$, $b'$ and $c'$ arranged in a row on the same vertical plane and intersecting the bore 14. The holes $a'$, $b'$, $c'$ are spaced apart the same distances as the notches $a$, $b$, $c$ and are adapted to register with said notches respectively at times.

The stem 13 is formed with a tenon 13′ centrally of its end opposite to the bore 14 and a tongue 14′ is formed on said tenon and is curved rearwardly and downwardly therefrom. The stem 13 also is formed with concave shoulders 18 on opposite sides of the tenon 13′. The tenon 13′ also is formed with a transverse aperture 13″ near its forward margin and the tongue 14′ is formed with a transverse aperture 14″ near its lower end. The stem 13 is secured to the standard 10 by a bolt $d$ inserted through one or another of the holes $a'$, $b'$, $c'$, and extending through the corresponding notch $a$, $b$ or $c$. When the stem 13 is to be set square with the standard 10 the bolt $d$ is passed through the holes $a'$ and notch $a$. When it is desired to set the stem 13 at a small angle to the standard 10 the bolt $d$ is removed from the holes $a'$ and is placed in the holes $b'$ and extends through the notch $b$. When it is desired to set the stem 13 at a greater angle to the standard 10 the bolt $d$ is removed and placed in the holes $c'$ and extends through the notch $c$. In either position the bolt $d$ rigidly connects the stem to the standard through engagement of said bolt intermediate of its ends in a notch of the shank 12. A prong 15 is provided and is curved laterally throughout its length. The prong 15 is bifurcated in its upper portion and is adapted to receive and embrace the tenon 13′ and tongue 14′. The upper end portions of the arms of the bifurcated prong are curved to fit the concave shoulders 18 of the stem and are formed with a transverse aperture 17 registering with the apertue 13″ of the tenon 13′ and a bolt 21 may be mounted in said holes and apertures and pivotally connect the prong to the tenon. A plurality of transverse bolt holes $e$, $e'$, $e''$ are formed in the central portion of the prong 15 and register at times with the hole 14″ in the tongue 14'. A bolt $d'$ may be mounted through one or the other of the holes $e$, $e'$ or $e''$ and through the hole 14'' and adjustably connect the prong 15 to the tongue 14'. The lower end portion of the prong 15 is formed with a rabbeted seat 19 having a central bolt hole 20 and a blade or shovel 16 may be mounted in said seat. The blade or shovel 16 preferably is formed with a bolt hole 20' and may be fixed to the prong by a bolt 21 in the holes 20, 20'. The blade 16 preferably is formed with a beveled margin 16' to produce a cutting edge. To set the blade or plow at an angle to the line of advancement of the cultivator the described adjustment of the stem 13 relative to the standard 10 is employed. To set the blade or plow 16 at an angle relative to the surface over which it travels the described adjustment of the prong 15 relative to the stem, tenon and tongue is employed. In either adjustment the blade or plow is used to scrape or cut on a horizontal plane relative to the surface of the ground.

I claim as my invention—

1. A plow attachment for cultivators, comprising a standard adapted to be secured to the beam of a cultivator and formed with a shank circular in cross-section, said shank further formed with transverse notches arranged in a helical row on its periphery, a stem formed with a bore fitting and adapted to receive said shank, said stem also formed with transverse holes registering at times with the transverse grooves of the shank, a prong pivoted to said stem and articulating on a horizontal axis, means extraneous to the pivot for adjustably connecting said prong and stem, said prong curved between its ends, and a plow fixed to the extremity of said prong.

2. A plow attachment for cultivators, comprising a standard adapted to be secured to the beam of a cultivator, an integral shank of circular cross-section depending from the standard and provided with a plurality of helically arranged transverse notches, a stem formed with a bore adapted to receive the said shank, said stem being formed with a plurality of transverse holes adapted to register at times with the notches of the shank, means co-acting with the said holes and slots for securing the stem to the shank, a tongue integral with and centrally depending from the stem, a prong having one end bifurcated to straddle the said tongue, means co-acting with the tongue and the prong for supporting the latter, means for retaining the prong in a fixed position relative to the tongue, and a shovel secured to the extremity of the prong.

JAMES A. SUTTON.

Witnesses:
 HARVEY BRADEN,
 WILLIAM T. BLACK.